(12) United States Patent
Wang et al.

(10) Patent No.: US 9,210,372 B2
(45) Date of Patent: Dec. 8, 2015

(54) COMMUNICATION METHOD AND DEVICE FOR VIDEO SIMULATION IMAGE

(71) Applicant: Tencent Technology (Shenzhen) Company Limited, Shenzhen (CN)

(72) Inventors: Fei Wang, Shenzhen (CN); Bo Chen, Shenzhen (CN); Ge Gao, Shenzhen (CN); Shang Yu, Shenzhen (CN); Kuaili Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 28 days.

(21) Appl. No.: 14/165,117

(22) Filed: Jan. 27, 2014

(65) Prior Publication Data
US 2014/0139619 A1   May 22, 2014

Related U.S. Application Data

(63) Continuation of application No. PCT/CN2013/072246, filed on Mar. 6, 2013.

(30) Foreign Application Priority Data

Mar. 29, 2012   (CN) .......................... 2012 1 0087665

(51) Int. Cl.
| | | |
|---|---|---|
| H04N 7/14 | (2006.01) | |
| G06T 13/00 | (2011.01) | |
| H04N 21/2343 | (2011.01) | |
| H04L 29/06 | (2006.01) | |
| H04N 21/234 | (2011.01) | |
| H04N 21/262 | (2011.01) | |
| H04N 21/43 | (2011.01) | |
| H04N 21/44 | (2011.01) | |
| H04N 21/654 | (2011.01) | |
| H04N 21/81 | (2011.01) | |

(52) U.S. Cl.
CPC ................ *H04N 7/147* (2013.01); *H04L 67/38* (2013.01); *H04N 21/23418* (2013.01); *H04N 21/234336* (2013.01); *H04N 21/26216* (2013.01); *H04N 21/4307* (2013.01); *H04N 21/44008* (2013.01); *H04N 21/654* (2013.01); *H04N 21/8146* (2013.01)

(58) Field of Classification Search
CPC ................................. G06T 13/40; G06T 15/00
USPC ........................................ 345/473; 348/14.01
See application file for complete search history.

(56) References Cited

U.S. PATENT DOCUMENTS

| | | | | |
|---|---|---|---|---|
| 2012/0280974 A1* | 11/2012 | Wang et al. | .................... | 345/419 |
| 2013/0346075 A1* | 12/2013 | Felkai et al. | .................. | 704/235 |
| 2014/0002464 A1* | 1/2014 | Furukawa et al. | ............ | 345/474 |

* cited by examiner

*Primary Examiner* — Creighton Smith
(74) *Attorney, Agent, or Firm* — Brinks Gilson & Lione (57) ABSTRACT

A method and device for communicating a video with a simulation image is provided. The method includes: acquiring, by a sender, video data, transforming the acquired video data into vector data in image recognition algorithm, and sending the vector data to a receiver; and calling, by the receiver, a cartoon rendering model and rendering the received vector data in the video with a corresponding cartoon simulation image according to the cartoon rendering model. By using the present invention, the amount of data transmitted in a network may be reduced, and network bandwidth resources are saved.

19 Claims, 6 Drawing Sheets

COMMUNICATION METHOD AND DEVICE FOR VIDEO SIMULATION IMAGE

This application is a continuation application of PCT international application PCT/CN2013/072246, filed on Mar. 6, 2013 which claims the priority of Chinese Patent Application No. 201210087665.1, entitled "METHOD AND DEVICE FOR COMMUNICATING A VIDEO WITH A SIMULATION IMAGE", filed with the Chinese Patent Office on Mar. 29, 2012, both of which are incorporated herein by reference in their entirety.

FIELD

The disclosure relates to the field of network communication technology, and in particular to a method and device for communicating a video with a simulation image.

BACKGROUND

With the development of the internet technology, a variety of communication tools based on the Internet are developed. Those communication tools, such as a simple instant messenger based on text, a voice communication tool, and an even video communication tool, have been widely applied in our daily life and work.

Actually, the video communication tool adopts webpage or client technology to realize a visualizing chat communication by a video capture tool such as camera. The two parties of the communication record their video images by the cameras installed in the data processing devices (e.g., computer, smart phone, etc.), and transmit their video images to each other by a chat tool in real time or non-real time. In this way, a visualizing chat may be realized, which is very lively. Thus, more and more internet users are fond of the video chat tool.

Figure 1:
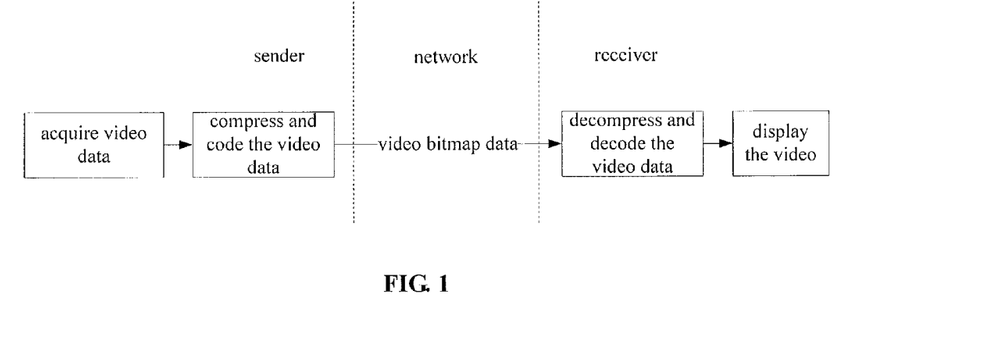
FIG. 1 is a schematic diagram of a typical method for processing and transmitting video data in the existing video chat technology.

FIG. 1 is a schematic diagram of a typical method for processing and transmitting video data in an existing video chat technology. As shown in FIG. 1, a sender and a receiver refer to the video chat tools installed in the data processing devices of the two parties of a communication. The video communication tool needs to be connected to a local video capture tool such as camera. The video chat communication tool of the sender may acquire video data recorded by a local camera; compress and code the video data; transform the data into video bitmap data; and transmit the bitmap data to the receiver via a network. The bitmap is also referred to as a raster image or a graphics image, which includes points called as pixels (image elements). Those points may be arranged and colored in different ways to form a pattern. After receiving the video bitmap data, the video chat tool of the receiver may decode and decompress the video bitmap data and display the processed data on a local display interface, and thus a video data transmission is realized. FIG. 1 only shows the process of transmitting video image in one direction, and the process in the other direction is the same. In this way, the video interaction between the two parties may be realized by the video chat tool.

Figure 2:
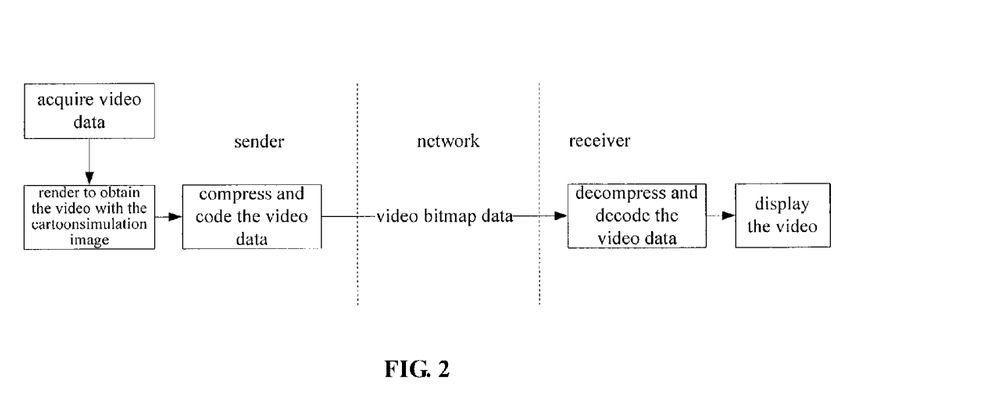
FIG. 2 is an schematic diagram of an existing method for simulating a figure image as a cartoon image in video chatting.

The video chat technology has some risks in security, such as leaking user's privacy and image, or stealing the video chat profile picture of a user and blackmailing the user by a hacker. In order to reduce the risk in the video chatting and keep video chat lively, a video simulation image communication technology is presented to simulate figure images of the video with cartoon images in video chatting. FIG. 2 is an existing schematic diagram of simulating figure images as cartoon images in video chatting. The technology shown in FIG. 2 is derived from the improvement of a traditional video communication technology as shown in FIG. 1, which includes: acquiring, by the video chat communication tool of a sender, video data recorded by a camera; filtering the video data, and simulating and rendering the recorded figure images of the video to obtain a corresponding cartoon simulation image of the video, i.e., a simulated video with the cartoon image; compressing and coding the video data with the cartoon image to generate video bitmap data; and transmitting the bitmap data to a receiver. After receiving the video data with the cartoon image, the video chat tool of the receiver may decode and decompress the video data with the cartoon image correspondingly, and finally the processed video data may be displayed on a local display interface.

There are some disadvantages of the existing technology as shown in FIG. 2.

The existing technology is only a simple improvement of the traditional video chat technology shown in FIG. 1, in which the rendered video data is coded and transmitted to the other party of the communication by traditional video compression technology. The object of this coding scheme is the real video data, the data transmitted in the network is video bitmap data and the data size thereof is large. Thus, the network traffic occupied by transmitting the data may be high and the video play may be not fluent in the limited network bandwidth resources.

SUMMARY

In view of this, the main object of the disclosure is to provide a method and device for communicating a simulation image of a video, in order to reduce the data volume transmitted in the network and save the bandwidth cost.

The solution of the disclosure is implemented by the following method and device.

The method for communicating a video with a simulation image includes:
  acquiring, by a sender, video data, transforming the acquired video data into vector data in image recognition algorithm and sending the vector data to a receiver; and
  calling, by the receiver, a cartoon rendering model, and rendering the received vector data in the video with a corresponding cartoon simulation image according to the cartoon rendering model.

A device for communicating a video with a simulation image includes:
  a video data acquisition module adapted to acquire local video data;
  an identifying and transforming module adapted to transform the acquired video data into vector data in image recognition algorithm;
  a sending module adapted to send the vector data to a receiver;
  a receiving module adapted to receive the data sent from the sender; and
  an opposite video simulation module adapted to call a cartoon rendering model, and render the received vector data in the video with a corresponding cartoon simulation image according to the cartoon rendering model.

A computer-readable medium, adapted to stores an instruction set, a computer may perform a method for communicating a video with a simulation image when the instruction set is executed.

Comparing with the existing technology, in this disclosure, a sender may acquire the video data and transform the acquired video data into vector data in image recognition algorithm, and send the vector data to a receiver. The receiver may render the vector data. Since the basic data of the rendered cartoon simulation image are all set in the cartoon rendering model, the receiver may read the cartoon rendering model and then render the received vector data in the corresponding cartoon image. In this disclosure, the vector data with small data size, instead of bitmap data, is transmitted in the network, thus the data volume transmitted in the network may be reduced, and the bandwidth resource may be saved.

DETAILED DESCRIPTION

The disclosure may be further specified as follows in conjunction with drawings and embodiments.

Figure 3:
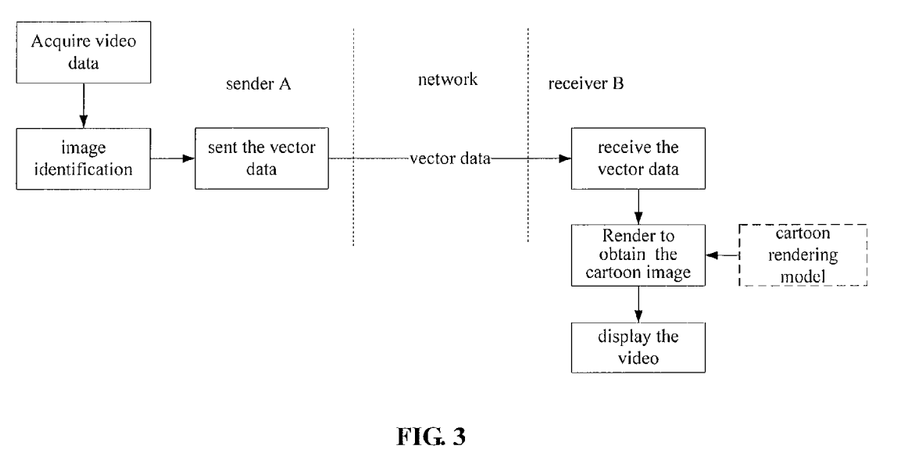
FIG. 3 is a flowchart of a method for communicating a video with a simulation image according to the disclosure.

FIG. 3 is a flowchart of a method for communicating a video with a simulation image according to the disclosure, which shows the process of communicating the video with the simulation image according to the disclosure in one direction. That is, FIG. 3 shows the process of transmitting the image of user A to user B in a video communication therebetween, where A is a sender and B is a receiver. The process of transmitting the image of user B to user A may be implemented in the same way, in which B is a sender and A is a receiver. In addition, the technical solution may be further applied in the video communication among multiple users, where a certain party may be considered as a sender, and the other parties may be considered as the receivers. The related process may be specified as follows.

As shown in FIG. 3, the method according to the disclosure may include: acquiring, by a sender, video data, transforming the acquired video data into vector data in image recognition algorithm, and sending the vector data to a receiver; calling, by the receiver, a cartoon rendering model, rendering the received vector data in the video with a corresponding cartoon simulation image (abbreviated as cartoon image herein) by the cartoon rendering model, and finally displaying a video with the cartoon simulation image.

Figure 4:
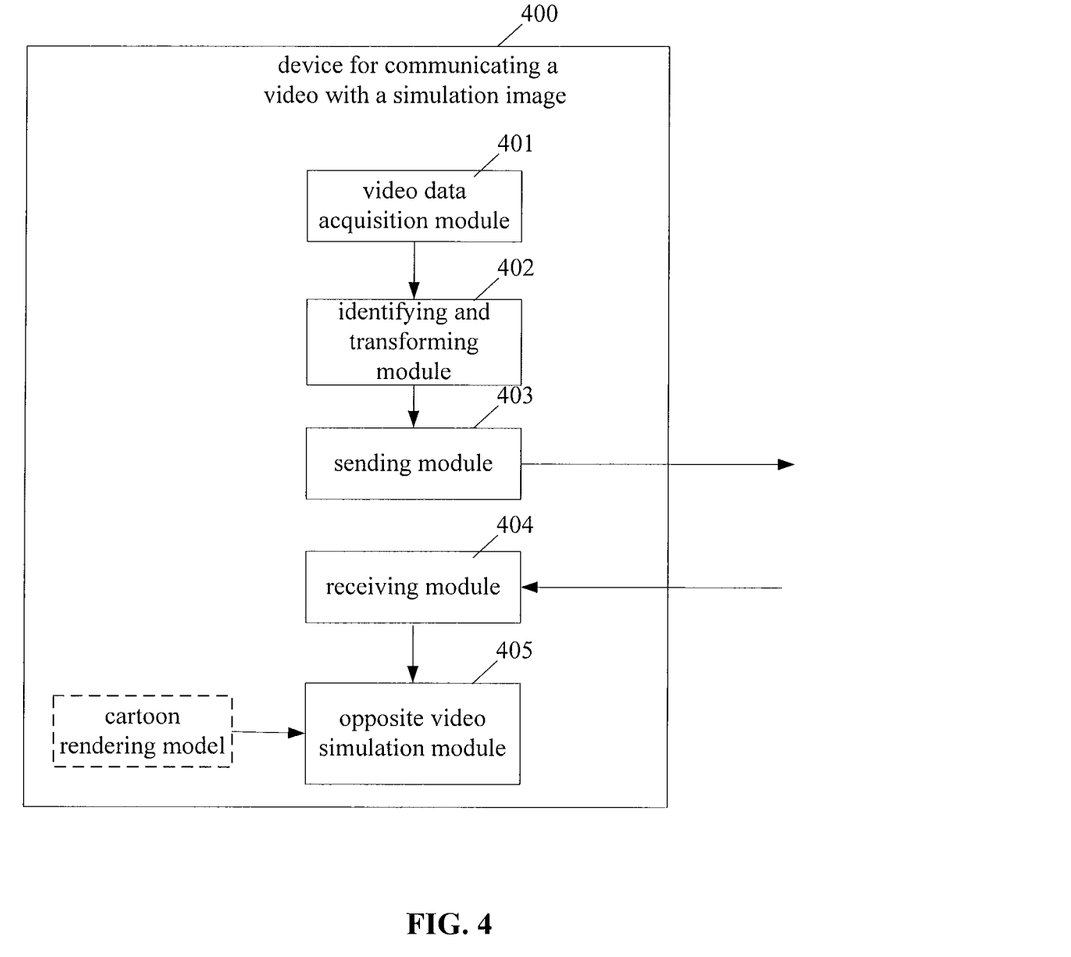
FIG. 4 is a structure diagram of a device for communicating a video with a simulation image according to the disclosure.

Correspondingly, a device for communicating a video with a simulation image is provided according to the disclosure, which is adapted to implement the method provided by the disclosure. FIG. 4 is a structure diagram of a device for communicating a video with a simulation image according to the disclosure. As shown in FIG. 4, the device is a video communication tool installed in a user terminal, and the two parties of the communication may implement the method according to the disclosure by the video communication tool and realize the video communication with cartoon simulation image provided by the disclosure. The device includes: a video data acquisition module 401, an identifying and transforming module 402, a sending module 403, a receiving module 404, and an opposite video simulation module 405.

The video data acquisition module 401 is adapted to acquire local video data.

The identifying and transforming module 402 is adapted to transform the acquired video data into vector data in image recognition algorithm.

The sending module 403 is adapted to send the vector data to a receiver.

The receiving module 404 is adapted to receive the data sent from the sender.

The opposite video simulation module 405 is adapted to call a cartoon rendering module, render the received vector data in the video with a corresponding cartoon simulation image by the cartoon rendering model, and output and display the rendered video with the cartoon simulation image.

In this specification, unless explicitly stated, the sender may refer to a video simulation image communication device of the sender, and the receiver may refer to a video simulation image communication device of the receiver.

In the method according to the disclosure, cartoon rendering model data need to be preset, where the basic data for rendering the video data to obtain the cartoon image by the receiver may all set in the cartoon rendering model data. The cartoon rendering model data may include basic figure model data, and may further include cartoon effect data, etc. The basic figure model data includes model data of faces, hair styles and five sense organs of the cartoon figure images, model data of clothes, model data of accessories such as glasses, etc. Each basic figure model data has calling identifier information. Once a calling identifier of model data is selected, a render is performed to obtain a corresponding image according to the model data. The selected calling identifier information, such as face (face identifier), the feature of the five sense organs (identifier of the five sense organs), hair style (hair style identifier), clothes (clothes identifier), whether wears a glasses or not and the styling of the glasses (glasses identifier), may be identified and obtained by the sender in image recognition algorithm. The cartoon effect data may be alternative to further enhance and enrich the effect of the cartoon figure images. The cartoon effect data may include cartoon effect data of expression and motion, such as cartoon effect data of happiness, shyness, sweating, etc.; or may be a predefined animation, etc. Each cartoon effect has a corresponding calling instruction data which is sent from the sender.

The cartoon rendering model data may be prestored in the receiver locally; or prestored in a certain server, and the receiver may be notified of the storage address thereof. After receiving the vector data, the receiver may download the cartoon rendering model data from the certain server.

As shown in FIG. 3, the sender may communicate with a video capture device, such as camera, of the sender terminal to acquire the video data record by the camera. In video chatting, the video data recorded by the sender are generally the figure image video with the user of the sender, which may include the appearance of the user (including hair style, face, clothes, etc.), expression, head and body movements. Then, the acquired video data may be processed in image recognition algorithm to obtain the vector data. The image recognition algorithm may adopt the existing technology, where may includes: 1) image preprocessing, such as grey level normalization; 2) face detecting and positioning; 3) figure feature extracting; and 4) face recognizing. The vector data of the image data may be obtained by processing the video data in image recognition algorithm. The data size of vector data is much smaller than that of bitmap data, thus the bandwidth cost may be reduced.

The vector data include the basic figure data and the figure variation data. The basic figure data is adapted to select from the cartoon rendering model a basic figure model, such as face (face identifier), the features of the five sense organs (identifier of the five sense organs), hair style (hair style identifier), clothes (clothes identifier), whether wears a glasses or not and the styling of the glasses (glasses identifier). The basic figure data is the calling identifier of the basic figure model data in the cartoon rendering model. The receiver may read the corresponding basic figure model data in the cartoon rendering model according to the calling identifier of these basic figure data and thereby performs the render to obtain the basic figure image of the cartoon simulation image in the video. A render processing may adopt the existing animation rendering technology, which may includes: 1) reading and loading model data; 2) calculating figure information of an object to be rendered from a rendering model formula according to the basic figure data and the loaded model data; 3) drawing a cartoon image.

The figure variation data is adapted to indicate dynamic change information of the figure in the current video, such as the extent of opening and closing the eyes (e.g., indicated in levels 1 to 3), the extent of opening and closing the mouth (e.g., indicated in levels 1 to 10), the range of shaking the head (e.g., indicated in levels −10 to 10). The receiver may obtain the dynamic cartoon simulation image in the video by modifying the rendered basic figure image according to the figure variation data.

Comparing with the existing technology, in this disclosure, vector data with a small data size, instead of bitmap data, is transmitted in the network, thus the data volume transmitted in the network may be reduced and the bandwidth cost may be saved. In addition, the transmitted bitmap data according to the existing technical solution has a constant video quality (e.g., image resolution). Once the sender performs the render to obtain the video with a low quality, the displayed video quality may be low even if the operational capability of the receiver's hardware is powerful. However, the data transmitted to the receiver is the vector data in this disclosure, if the operational capability of the receiver's hardware is powerful, the receiver may perform the render to obtain the video with better video effect than the sender, such as higher image resolution and more lifelike animation details.

Figure 5:
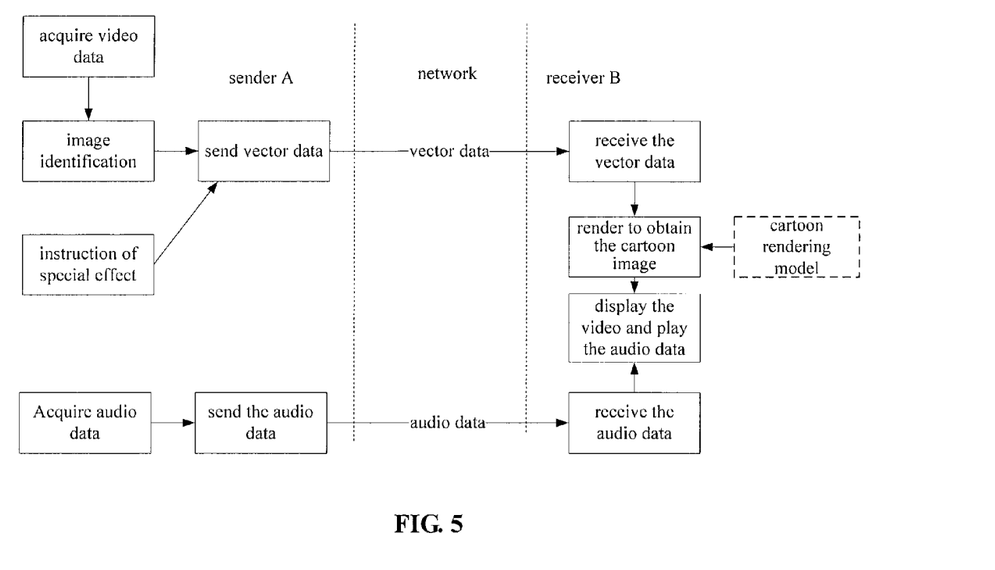
FIG. 5 is a flowchart of another embodiment of the method according to the disclosure.

FIG. 5 is a flowchart of another embodiment of the method according to the disclosure. As shown in FIG. 5, in this embodiment, the video simulation image communication device of the sender may further be connected with an audio capture device, such as microphone, to capture audio data and send the data to the receiver. The receiver may play the received audio data together with the rendered cartoon image synchronously. The audio data may be transmitted via an independent communication channel or the communication channel for transmitting the vector data.

Figure 7:
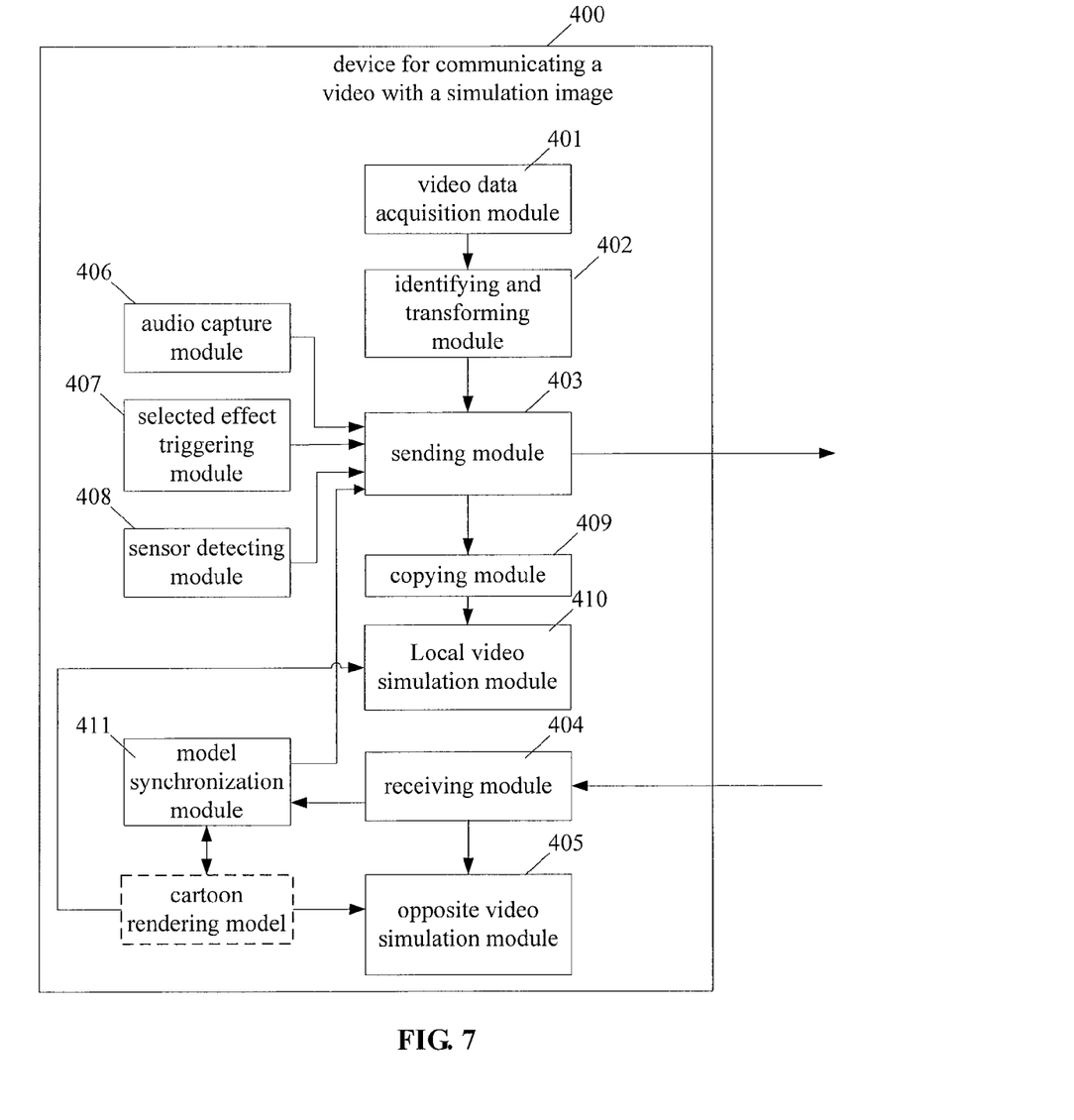
FIG. 7 is a structure diagram of another embodiment of the device for communicating a video with a simulation image according to the disclosure.

Correspondingly, as shown in FIG. 7, in a device for communicating a video with a simulation image according to an embodiment of the disclosure, the device may further include: an audio capture module 406 adapted to capture audio data, where the sending module 403 may further send the audio data to the receiver; the opposite video simulation module 405 is further adapted to play the audio data received from receiver together with the rendered cartoon image synchronously.

In the embodiment shown in FIG. 5, the sender may further send an instruction of a special cartoon effect which may be sent to the receiver as a part of the vector data. These instructions correspond to the cartoon effect data in the cartoon rendering model. A specific instruction corresponds to a specific cartoon effect. For example, the instructions may include the cartoon effect instruction of moods, such as the cartoon effect instructions of happiness, shyness, sweating, etc., or an instruction of playing a predefined animation.

There are multiple ways to trigger the cartoon effect instruction, which includes the following two ways.

In triggering mode I, the sender provides a triggering mechanism for a selected carton effect, for example, a trigger button set on the interface, which is adapted to trigger a cartoon effect of happiness, shyness, sweating, etc. After the triggering mechanism is triggered (e.g., the button is clicked), the corresponding cartoon effect instruction data may be sent to the receiver. The receiver may read the corresponding cartoon effect data in the cartoon rendering model according to the received instruction data, and perform the render to obtain the cartoon effect on the cartoon simulation image. For example, if the cartoon effect instruction of shyness is triggered, the cartoon effect of shyness may be rendered.

In triggering mode II, the sender detects a sensing signal by a sensor. For example, at present, many cellphones is provided with the sensors for detect the sensing signals, such as the shaking, position and oriented direction of the cellphone. The device for communicating the video with the simulation image at the sender acquires the sensing signals of these sensors, and sends the sensing signal data to the receiver as the instructions of the cartoon effects. The cartoon rendering model stores a corresponding relation between the sensing signal and the cartoon effect. The receiver may read the corresponding cartoon effect data from the cartoon rendering model according to the received sensing signal data and perform the render to obtain the corresponding cartoon effect on the video with the cartoon simulation image.

Correspondingly, as shown in FIG. 7, in the device for communicating the video with the simulation image according to an embodiment of the disclosure, the device 400 may further include a selected effect triggering module 407 adapted to provide a triggering mechanism for a selected carton effect. After the triggering mechanism is triggered, the corresponding cartoon effect instruction data may be sent to the receiver by the sending module 403; the opposite video simulation module 405 is further adapted to read the corresponding cartoon effect data from the cartoon rendering model according to the received instruction data, and perform the render to obtain the cartoon effect on the video with the cartoon simulation image.

The device 400 may further include a sensor detecting module 408 adapted to detect a sensing signal by a sensor and send the sensing signal data to the receiver by the sending module 403. The opposite video simulation module 405 is further adapted to read corresponding cartoon effect data from the cartoon rendering model according to the received sensing signal data, and render out the corresponding cartoon effect on the video with the cartoon simulation image.

As for the data transmission mode, in order to enhance the transmission efficiency, before sending the data to the receiver, the sender in this disclosure may further code and compress the data to be sent in certain ways such as Huffman coding or Gzip data compression method, and thus reducing the data size to be sent in the network. After receiving the data sent from the sender, the receiver may further decompress and decode the data. In a specific transmission process, different transmission modes, such as a one-to-one communication (a chat between two users), or a one-to-many communication (video conference, group game), may be applied to different situations. According to the different communication modes, the data may be transmitted in real time or non-real time, and the data may be stored in a server temporarily or be relayed by a server. The data may be transmitted in the network in high speed because of the small data size.

Correspondingly, in a device for communicating a video with a simulation image according to an embodiment of the disclosure, the sending module further includes a coding module adapted to code and compress the data to be sent before sending the processed data. The receiving module further includes a decoding module adapted to decode and decompress the received data and send the processed data to the opposite video simulation module for processing.

Figure 6:
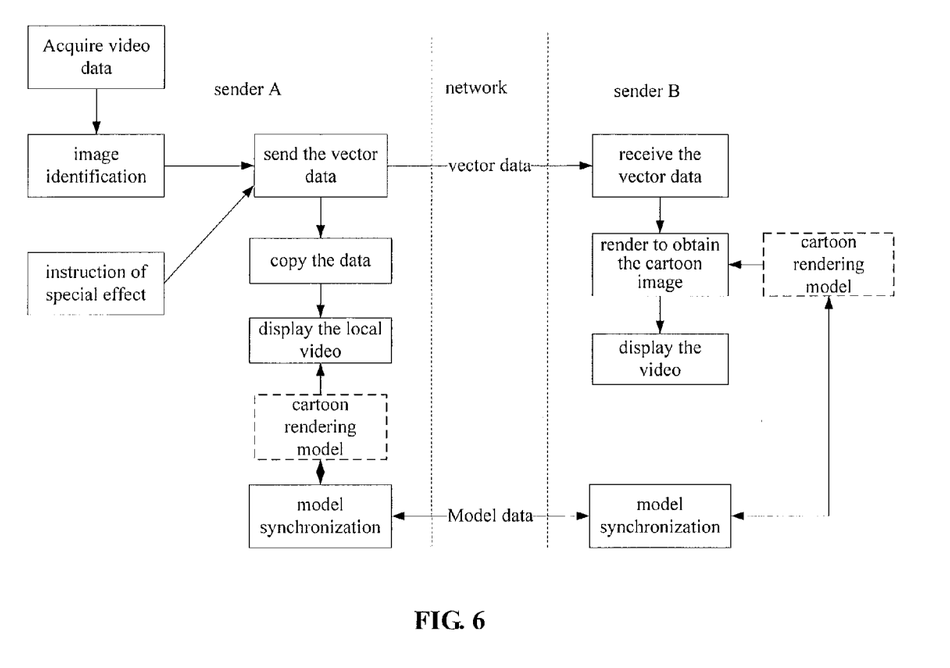
FIG. 6 is a flowchart of still another embodiment of the method according to the disclosure.

In the process for communicating the video with the cartoon simulation image interactively, the two parties of the communication may not only expect the opposing party to see the video with his/her cartoon image, but also expect to see the video with his/her own cartoon image locally. In order to achieve this goal, as shown in FIG. 6, in an embodiment of the disclosure, the method may further include: copying, by the sender, the data to be sent to the receiver locally, and calling the same cartoon rendering model as the receiver, and rendering the copied data in the video with the corresponding cartoon simulation image by the cartoon rendering model. The rendering step may include: rendering the vector data in the same video with the cartoon image as the receiver, performing the render to obtain the corresponding cartoon effect according to the instruction data triggered by the trigger mechanism and/or the sensing signal detected by the sensor, and playing the cartoon image rendered locally together with the audio data captured by the local microphone synchronously.

In order to guarantee that the video with a cartoon image of the sender displayed to the user of the sender locally has a same effect as that seen by the receiver, the two parties need to call the same cartoon rendering model data, or call the same cartoon rendering model data and the same local hardware configuration information for rendering video. The hardware configuration information may be screen resolution and refresh frequency, etc. If the same cartoon rendering model data is called by the two parties, the two parties may perform the render to obtain the same cartoon image effect. If the two parties have the same hardware configuration, the display effects of the rendered video with the cartoon image may be more consistent.

As shown in FIG. 6, in order that the sender and the receiver call the same cartoon rendering model data or call the same cartoon rendering model data and the same local hardware configuration information, the cartoon rendering model and the hardware configuration information need to be synchronized, which includes two synchronization modes.

In a first synchronization mode, at least one party of the communication is configured with the cartoon rendering model. In a real-time communication between the two parties, they may transmit synchronously the cartoon rendering model data according to the negotiated communication protocol. The two parties may call directly the local cartoon rendering model when the cartoon rendering model needs to be called. When transmitting synchronously the cartoon rendering model data according to the communication protocol, the two parties may further transmit synchronously the local hardware configuration information for video rendering, and uniform their hardware configuration information according to the predetermined strategy.

In a second synchronization mode, only the sender is configured with the cartoon rendering model. In a non-real-time communication between the two parties, while transmitting the vector data, the sender may send and store the cartoon rendering model data to the selected server, and notify the receiver of the storage address. After receiving the vector data, the receiver may download the cartoon rendering model data from the storage address. The two parties may call directly the local cartoon rendering model when the cartoon rendering model need to be called. When sending the cartoon rendering model data, the sender may further send the local hardware configuration information for video rendering to the receiver. After receiving the data, the receiver may uniform the local hardware configuration information with the hardware configuration information of the sender.

Correspondingly, as shown in FIG. 7, the device for communicating the video with the simulation image may further include: a copying module 409 and a local video simulation module 410, The copying module 409 is adapted to copy locally the data to be sent to the receiver.

The local video simulation module 410 is adapted to call the same cartoon rendering model as the opposite party, and render the copied data in the video with the corresponding cartoon simulation image according to the cartoon rendering model.

The device for communicating the video with the simulation image may further include a model synchronization module 411 adapted to synchronize the cartoon rendering model data of the two parties of the communication, or synchronize the cartoon rendering model data and the hardware configuration information for video rendering. Particularly, the above synchronization mode may be adopted.

A device for communicating a video with a simulation image is provided according to the embodiments of the disclosure, including: a memory adapted to store instructions; a processor adapted to couple with the memory. The processor is adapted to execute the instruction stored in the memory, and to be adapted to implement the embodiments of the above method for communicating the video with the simulation image. In addition, a computer-readable medium is provided by the embodiments of the disclosure, which stores an instruction set. When the instruction set is executed, the computer may implement the embodiments of the above method for communicating the video with the simulation image.

The above contents are only the preferable embodiments provided by the disclosure, but not the limitation of the disclosure. Any modification, replacement and improvement made within the principle of the disclosure, may fall into the protection scope thereof.

The invention claimed is:

1. A system for communicating a video with a simulation image, comprising:
   acquiring, by a sender, video data, transforming the acquired video data into vector data in image recognition algorithm, wherein the vector data comprises basic figure data and a respective level of figure expression variation data from a plurality levels of figure expression;
   sending, by the sender, the vector data to a receiver;
   calling, by the receiver, a cartoon rendering model;
   reading, by the receiver, the basic figure model data from the cartoon rendering model to obtain a basic figure image of a video with a cartoon simulation image; and
   modifying, by the receiver, the basic figure image to obtain a dynamic video with the cartoon simulation image according to the respective level of figure expression variation data.

2. The system according to claim 1, further comprising:
acquiring, by the sender, audio data and sending the data to the receiver, wherein the receiver plays the received audio data together with the rendered video with the cartoon simulation image synchronously.

3. The system according to claim 1, further comprising:
providing, by the sender, a triggering mechanism for a selected carton effect, and sending instruction data corresponding to a cartoon effect to the receiver after the triggering mechanism is triggered;
reading, by the receiver, corresponding cartoon effect data from the cartoon rendering model according to the received instruction data, and performing a render to obtain the cartoon effect on the video with the cartoon simulation image.

4. The system according to claim 1, further comprising:
detecting, by a sensor of the sender, a sensing signal, and sending, by the sender, sensing signal data to the receiver;
reading, by the receiver, corresponding cartoon effect data from the cartoon rendering model according to the sensing signal data, and performing a render to obtain the cartoon effect on the video with the cartoon simulation image.

5. The system according to claim 1, comprising:
copying, by the sender, data to be sent to the receiver locally and calling the same cartoon rendering model as the receiver and rendering the copied data in the video with the corresponding cartoon simulation image according to the cartoon rendering model.

6. The system according to claim 5, wherein the calling the same cartoon rendering model as the receiver comprises:
configuring at least one party of the communication with the cartoon rendering model, wherein in the case of a real-time communication between the sender and the receiver, the sender and the receiver transmit synchronously cartoon rendering model data according to negotiated communication protocol; the sender and the receiver call directly a local cartoon rendering model when the cartoon rendering model is called; or
configuring only the sender with the cartoon rendering model, wherein in the case of a non-real-time communication between the sender and the receiver, while transmitting the vector data, the sender sends and stores cartoon rendering model data to a selected server, and notifies the receiver of a storage address of the cartoon rendering model data; after receiving the vector data, the receiver download the cartoon rendering model data from the storage address; and the sender and the receiver call directly a local cartoon rendering model when the cartoon rendering model is called.

7. The system according to claim 6, comprising:
sending, by the sender or the receiver, local hardware configuration information for video rendering while sending the cartoon rendering model data;
adjusting, by the receiver or the sender, a corresponding displaying effect according to the hardware configuration information after receiving the hardware configuration information.

8. The system according to claim 1, comprising:
coding and compressing, by the sender, data to be sent before sending the data to the receiver;
decompressing and decoding, by the receiver, the data after receiving the data sent from the sender.

9. A device for communicating a video with a simulation image, comprising at least one processor and a memory having processor-executable instructions stored therein, and the instructions when executed by the at least one processor, configure a sender and a receiver to perform functions:
wherein the sender is configured to:
acquire local video data;
transform the acquired video data into vector data in image recognition algorithm, wherein the vector data comprises basic figure data and a respective level of figure variation data from a plurality of levels of figure expression; and
send the vector data to the receiver;
wherein the receiver is configured to:
receive the vector data sent from the sender; and
call a cartoon rendering model,
read basic figure model data from the cartoon rendering model according to the basic figure model data to obtain a basic figure image of a video with a cartoon simulation image, and modify the basic figure image to obtain a dynamic video with the cartoon simulation image according to the respective level of figure expression variation data.

10. The device according to claim 9, wherein the device is further configured to:
acquire audio data,
send the audio data to the receiver; and the receiver is further configured to play the received audio data together with the rendered video with the cartoon simulation image synchronously.

11. The device according to claim 9, wherein the device is further configured to:
provide a triggering mechanism for a selected carton effect, and send instruction data corresponding to a cartoon effect to the receiver after the triggering mechanism is triggered,
wherein the receiver is further adapted to read corresponding cartoon effect data from the cartoon rendering model according to the received instruction data, and performing a render to obtain the cartoon effect on the video with the cartoon simulation image.

12. The device according to claim 9, wherein the device is further configured to:
detect a sensing signal by a sensor, wherein the sending module sends the sensing signal data to the receiver, and wherein
the receiver is further adapted to read corresponding cartoon effect data from the cartoon rendering model according to the received sensing signal data and performing a render to obtain the corresponding cartoon effect on the video with the cartoon simulation image.

13. The device according to claim 9, wherein the device is further configured to:
copy locally the data to be sent to the receiver,
wherein the receiver is adapted to call the same cartoon rendering model as the opposite party and render the copied data in the video with the corresponding cartoon simulation image according to the cartoon rendering model.

14. The device according to claim 13, wherein the device is further configured to:
synchronize cartoon rendering model data of the sender and the receiver, or synchronize cartoon rendering model data and hardware configuration information for video rendering.

15. The device according to claim 9, wherein the device is further configured to: code and compress the data to be sent before sending the processed data, and wherein the receiver is further adapted to decode and decompress the received data before sending the processed data to the opposite video simulation module for processing.

16. A method for displaying cartoon image at a receiver device, the method comprising:
retrieving vector data from video data received at the receiving device via a network from a sending device wherein the vector data includes basic figure data and a respective level of figure expression variation data from a plurality levels of figure expressions;
based on an identifier retrieved from the basic figure data selecting a cartoon rendering model;
displaying the cartoon image wherein the cartoon image is rendered based on the basic figure data and the selected cartoon rendering model; and
modifying the displayed cartoon image based on the respective level of figure expression variation data.

17. The method of claim 16, further comprising receiving via a communication channel audio data and displaying the audio data synchronously with the modification to the displayed cartoon image.

18. The method of claim 16, wherein the displaying of the cartoon image comprises configuring the receiving device according to hardware configuration of the sending device.

19. The method of claim 16, wherein the retrieving of the vector data comprising decompressing the video data.

* * * * *